US010882648B2

(12) United States Patent
 Sireix (10) Patent No.: US 10,882,648 B2
(45) Date of Patent: Jan. 5, 2021

(54) DEVICE FOR SEALING THE BOTTOM OR LID OF AN ECOLOGICALLY DESIGNED CARDBOARD BOX USING AN EXTENSIBLE BEARING ELEMENT

(71) Applicant: George Sireix, Riedisheim (FR)

(72) Inventor: George Sireix, Riedisheim (FR)

( * ) Notice: Subject to any disclaimer, the term of this patent is extended or adjusted under 35 U.S.C. 154(b) by 141 days.

(21) Appl. No.: 16/195,834

(22) Filed: Nov. 19, 2018

(65) Prior Publication Data

US 2019/0152631 A1  May 23, 2019

(30) Foreign Application Priority Data

Nov. 20, 2017 (FR) ..................................... 17 60930

(51) Int. Cl.
 *B65B 7/28* (2006.01)
 *B31B 105/00* (2017.01)
 (Continued)

(52) U.S. Cl.
 CPC .......... *B65B 7/2821* (2013.01); *B65B 7/2878* (2013.01); *B65D 77/2096* (2013.01); *B29C 65/18* (2013.01); *B29C 65/32* (2013.01); *B29C 66/1122* (2013.01); *B29C 66/24221* (2013.01); *B29C 66/24223* (2013.01);
 (Continued)

(58) Field of Classification Search
 CPC ........... B65B 7/16; B65B 7/28; B65B 7/2821; B65B 7/2842; B65B 7/285; B65B 7/2878; B31B 2105/0022; B67C 2003/2648
 USPC .......... 53/433, 478, 488, 489, 511, 319–321, 53/324, 329.2, 348, 357, 359–361
 See application file for complete search history.

(56) References Cited

U.S. PATENT DOCUMENTS 2,891,366 A * 6/1959 Stover ....................... B67B 3/18
 53/361
3,169,355 A * 2/1965 Hollaway et al. ...... B65B 31/04
 53/88
(Continued)

FOREIGN PATENT DOCUMENTS

DE  1912698 A1 * 10/1970 ............. B31B 50/00
DE  2454200 A1 *  5/1976 ............... B65B 7/28
(Continued)

OTHER PUBLICATIONS

Search Report mailed in FR 1760930 dated Jun. 8, 2018.

*Primary Examiner* — Stephen F. Gerrity
(74) *Attorney, Agent, or Firm* — Wissing Miller LLP (57) ABSTRACT

An extensible bearing element of a tool for sealing a bottom or a lid of a cardboard package on a body of said package has a generally polygonal shape and a cross-sectional profile. The bearing element is formed by two parallel extension sections extending along an extension direction, each connected, at one of their ends, to a bearing section. The extension sections and the bearing section define an inflation cavity. The extension sections are configured to extend along the extension direction when the bearing element is inflated. The bearing section comprises a substantially flat, free bearing surface that contacts the package body. The bearing surface extends along a plane substantially normal to the extension direction. The bearing section further comprises, at the junctions with the extension sections, beveled release portions. An inflation device comprising such an extensible bearing element is also described.

17 Claims, 11 Drawing Sheets

(51) Int. Cl.
  *B65D 77/20* (2006.01)
  *B31D 1/00* (2017.01)
  *B65D 3/26* (2006.01)
  *B29C 65/00* (2006.01)
  *B29C 65/32* (2006.01)
  *B29C 65/18* (2006.01)

(52) U.S. Cl.
  CPC .. *B29C 66/24241* (2013.01); *B29C 66/24244* (2013.01); *B29C 66/24245* (2013.01); *B29C 66/53461* (2013.01); *B29C 66/542* (2013.01); *B29C 66/612* (2013.01); *B29C 66/63* (2013.01); *B29C 66/71* (2013.01); *B29C 66/7234* (2013.01); *B29C 66/72328* (2013.01); *B29C 66/72341* (2013.01); *B29C 66/7392* (2013.01); *B29C 66/8122* (2013.01); *B29C 66/81455* (2013.01); *B29C 66/8322* (2013.01); *B29C 66/849* (2013.01); *B29C 66/929* (2013.01); *B31B 2105/0022* (2017.08); *B31D 1/005* (2013.01); *B31D 1/0068* (2013.01); *B31D 1/0075* (2013.01); *B65D 3/268* (2013.01)

(56) References Cited

U.S. PATENT DOCUMENTS

| | | | | |
|---|---|---|---|---|
| 3,519,035 | A | * | 7/1970 | Remane ................ G01F 11/32 141/52 |
| 3,683,976 | A | * | 8/1972 | Rennane ................ F16K 21/18 141/59 |
| 4,599,123 | A | * | 7/1986 | Christensson .... B29C 66/81419 156/69 |
| 4,640,733 | A | * | 2/1987 | Bogren ............. B29C 66/72321 156/380.2 |
| 4,724,654 | A | * | 2/1988 | Dahlin et al. ......... B29C 66/131 53/330 |
| 5,156,200 | A | * | 10/1992 | Mette ....................... B67C 3/26 141/287 |
| 5,339,595 | A | | 8/1994 | Rouse et al. |

FOREIGN PATENT DOCUMENTS

| | | |
|---|---|---|
| EP | 0668151 | 8/1995 |
| EP | 2623306 | 8/2013 |
| EP | 2738105 | 6/2014 |
| FR | 2302915 | 10/1976 |

\* cited by examiner

DEVICE FOR SEALING THE BOTTOM OR LID OF AN ECOLOGICALLY DESIGNED CARDBOARD BOX USING AN EXTENSIBLE BEARING ELEMENT

CROSS REFERENCE TO RELATED APPLICATIONS

This application claims priority under 35 U.S.C. § 119(b) to French Patent Application No. 1760930, filed Nov. 20, 2017, the disclosure of which is incorporated herein by reference.

The invention relates to the production of cardboard boxes intended to receive food products. More particularly, it relates to a device and method for sealing the bottom or lid of an ecologically designed cardboard box.

BACKGROUND

In general, cardboard packages intended to receive food products comprise a box body with a general shape of revolution, for example tubular or polygonal, made from one or several layers of cardboard material, as well as a closing structure comprising a lid and a safety membrane that are assembled to the tubular body sealably. A bottom is assembled to the assembly made up of the body and the closing structure after it is filled with the food product. Such a package and its manufacture are for example known from EP 2,623,306.

Ecologically designed cardboard package here refers to packages whereof at least 90 to 98 wt % are made from cellulose materials. This type of package comprises, in addition to layers of cellulose materials, synthetic layers or coatings whereof at least one of the surfaces has received, under vacuum, a thin metallized or silica oxide layer intended to provide a high barrier to oxygen and steam, associated with the cellulose materials to form a composite surface material. These metal or synthetic coatings constitute, according to a generally accepted terminology, a "barrier material" insulating the material stored inside the package from the outside environment, for example to prevent oxidation, desiccation, or contamination by chemical or biological pollutants. These synthetic coatings are protected by a synthetic sealing film between two parts of the package during manufacturing thereof. In this case, they are generally described as "reactivatable barrier material".

To assemble the box body to the bottom or the lid, a so-called sealing method is applied. In this method, during a first step, the precut bottom or lid is introduced flat into a die of a sealing tool. Then, during a shaping step, the required shape is imparted to the bottom (for example in a basin shape) or the lid under the action of a stamp. Subsequently, during a sealing step, a significant force is applied on the body to grip it against the bottom, then the stamp is heated by conduction or another heating method. The combined action of the force on the body and the heating causing the reactivatable material (for example, an adhesive or a plastic film) to melt makes it possible to create an adhesion of the walls of the bottom to the body. During a cooling step, air is circulated in the shaping tool in order to cool the bottom and box body assembly thus formed. Lastly, the assembled box body and bottom or lid assembly is removed from the sealing tool. Such a method is for example described in document EP 0,668,151.

A shaping tool used in such a sealing method therefore comprises, in addition to the sealing stamp, a die intended to impart its shape during its passage therein, as well as a counter-die intended to apply, on the outer body of the box, a substantial force necessary for the sealing of the bottom.

In the current facilities, such counter-dies are of two types: rigid counter-dies and inflatable seal counter-dies. Rigid counter-dies are made from precision-machined steel so as to provide optimal gripping of the box body against the bottom/lid retained by the sealing stamp, while providing appropriate dimensions. Inflatable seal counter-dies also comprise a part made from machined steel, in which an elastomeric O-ring is housed intended to be inflated such that it can apply the necessary force for sealing.

These two types of dies, however, have drawbacks. Rigid counter-dies in particular are not suitable for sealing boxes needing to contain a neutral gas to preserve product over a long duration, since micro-leaks can occur due to the existence of variations in thickness along the box body or the bottom/lid which machining, despite its precision, cannot make up. However, they are not sensitive to the pollution of the packaged product, steel not retaining powdery products.

Conversely, inflatable seal counter-dies make it possible to provide constant gripping despite any variations in thickness of the body or the bottom/lid, but they are sensitive to the pollution of certain packaged products such as powders (cocoa, coffee, flour, etc.). They must therefore be cleaned regularly to work properly. Furthermore, being very close to the box body during the insertion of the bottom/lid into the tool, the annular seal wears out easily (in particular by friction during the removal of the box body from the tool) and must therefore be replaced frequently. Lastly, inflatable seal counter-dies do not make it possible to receive box bodies with overly varied thicknesses due to the low extension potential of the O-ring in its housing.

U.S. Pat. No. 5,339,595 relates to a head for a device for filling a container and the insertion of a stopper inside a neck of the container while producing a vacuum inside the head. The head comprises a bladder, retained by a retaining ring, which extends inward toward the walls of the neck of the container in order to form a tight peripheral seal around the neck of the container during the formation of the vacuum.

Patent FR 2,302,915 relates to a device for applying a lid on a container made from a flexible material by depositing a lid on the edges of the container, then bending the edges using an annular skirt inflatable under the effect of a pressurized fluid.

BRIEF SUMMARY

The extensible bearing element is intended to be arranged in a tool for sealing a bottom or a lid of a cardboard package on a body of said package, with a generally polygonal shape,
  the bearing element having a profile in cross-section comprising two extension sections with a parallel generally elongated shape extending along an extension direction,
  the extension sections each being connected, at one of their ends, to a bearing section, such that the extension sections and the bearing section define an inflation cavity of the extensible bearing element,
  the extension sections being configured so as to extend along the extension direction during the inflation of the extensible bearing element,
  the bearing section comprising a substantially flat free bearing surface, configured to come into contact with the package body, the bearing surface extending along a plane substantially normal to the extension direction.

The bearing element preferably comprises maintaining lips extending, from ends of the extension sections opposite the bearing section, along a direction substantially normal to the extension direction.

According to a preferred aspect of the invention, the bearing section further comprises, at the junctions with the extension sections, beveled release portions.

The arrangement of the extensible bearing element makes it possible to avoid the pitfalls of the prior art. First of all, the extension sections give the extensible bearing element a resiliency allowing the extension of the extensible bearing element toward the box body, thus making it possible to adapt to the micro-variations in thickness of the box body or the bottom/lid and to avoid leaks, but also to receive box bodies of varied thickness owing to a better extension potential. Furthermore, the bearing surface, due to its flat shape, does not retain powders, which means that the extensible bearing surface does not need to be cleaned too often. In particular, powders may separate from the bearing surface when the extensible bearing element is removed from its housing of the counter-die after inflation. Lastly, the bearing section makes it possible to transmit the bearing forces over the box body uniformly, owing to the bearing surface, which sees to the proper transmission of forces, and to the release portions, which prevent the transmission of forces over the parts of the box body that are not in contact with the sealing stamp. As a result, the boxes are not deformed and the extensible bearing element is destroyed significantly less quickly than an inflatable O-ring.

It thus becomes possible to reduce the development time of the counter-sealing dies, their machining no longer needing to be done with very high precision allowances like in the case of rigid counter-sealing dies, as well as to avoid leaks due to variations in thickness of the bodies or bottom/lids. Furthermore, the facility does not need to be cleaned as often as those of inflatable O-ring counter-dies. Lastly, the extensible bearing element according to the invention does not need to be replaced as often as O-rings.

The invention further makes it possible to give the sealing facilities great usage flexibility, since it allows uniform sealing of the perimeter of the package irrespective of the shape of the box and accepting variations in its thickness. It also reduces the production costs of the packages due to the reduced upkeep of the sealing tool.

According to one feature of the invention, in order to keep the extensible bearing element firmly in the housing of the die of the sealing tool, the extensible bearing element further comprises outer maintaining lips extending, from the end of the extension sections opposite the bearing section, along a direction substantially normal to the extension direction.

Preferably, in order to increase the sealing provided by the extensible bearing element during vacuum, placement under low pressure and placement under high pressure phases of the inflation cavity, it further comprises inner maintaining lips extending, from ends of the extension sections opposite the bearing section, along a direction substantially normal to the extension direction, moving away from the inflation cavity.

Preferably, in order to increase the surface of the bearing section and therefore the forces transmitted by the extensible bearing element onto the box body, the bearing section comprises a concave reinforcing portion extending in the direction away from the bearing surface, the reinforcing portion for example extending from one extension section to the other, toward the inside of the inflation cavity.

According to one particular embodiment suitable for the sealing of lids on the box body, a groove is formed in the bearing surface on a specific portion of the circumference of the extensible bearing element, the groove for example having a semicircular section. The presence of such a groove makes it possible to define a partial recess of the profile of the extensible bearing element so as to create a sealing weak spot at an easy opening tongue of a membrane of the lid.

Preferably, in order to increase the surface of the bearing section and therefore the forces transmitted by the extensible bearing element onto the box body and so as to reinforce the extensible bearing element at the groove, the bearing section comprises a concave reinforcing portion complementary to the groove extending in the direction away from the bearing surface.

In one particular embodiment of the invention, the beveled recess portions form a chamfer between the extension sections and the bearing surface, for example producing an angle between 20° and 40°, preferably 30° with the extension sections.

The invention also relates to a device for sealing a lid or a bottom of a package on a package body comprising an extensible bearing element according to the invention.

The sealing device comprises:
a die for shaping a bottom or a lid, intended to receive a bottom or a lid;
a counter-die, intended to receive a package body, comprising a housing receiving the extensible bearing element located across from the sealing zone of the body of the package and respectively the bottom or the lid; and
means for inflating the extensible bearing element by means of the inflation cavity that are configured to cause the extension of the extension sections, such that the extension of the extension sections causes the bearing surface to be placed in contact against the box body.

In one specific embodiment of the invention, the device for sealing a bottom comprises means for creating a vacuum of a space comprised between the package body, a product contained in the package body and the bottom, once the body is inserted into the counter-die and the bottom is inserted into the die.

The method according to the invention is a method for sealing a lid or a bottom of a package on a package body using a sealing tool according to the invention, comprising the following steps:
inserting a bottom or a lid into a shaping die for the bottom or the lid across from a counter-die provided with a housing into which the extensible bearing element is placed;
inflating the extensible bearing element by means of the inflation cavity to cause the extension of the extension sections, such that the extension of the extension sections causes the bearing surface to be placed in contact against the box body; and
placing the extensible bearing element under vacuum so as to cause the extensible bearing element to withdraw into its housing.

Preferably, the inflation of the extensible bearing element is done by introducing gas, for example air, or heat transfer fluid into the inflation cavity at a predetermined inflation pressure.

According to one particular embodiment of the invention, in order to reinforce the sealing of a space comprised between the inside of the box body during the shaping, a product contained in the box body and the bottom, after the step for inserting the bottom or the lid into the die, and before the step for inflating the extensible bearing element, a pre-inflation of the extensible bearing element is done to cause the extension of the extension sections, such that the extension of the extension sections causes the placement of the bearing surface in contact against the box body, the pre-inflation of the extensible bearing element being done by introduction of gas, for example air, or heat transfer fluid into the inflation cavity at a predetermined pre-inflation pressure lower than the inflation pressure.

According to one particular embodiment of the invention, in order to avoid loosening of the bottom or lid from the box body during the removal of the sealing stamp used to shape the lid/bottom during the cooling step, after the inflation step of the extensible bearing element and before the step for placing the extensible bearing element under vacuum, a step is carried out for partial deflation of the extensible bearing element, in which the pressure of the gas or heat transfer fluid introduced into the inflation cavity is reduced to a predetermined value below the inflation pressure. Indeed, the partial and not total deflation makes it possible for the extensible bearing element to continue to exert pressure on the circumference of the box body upon removal of the sealing stamp, which avoids loosening of the lid or bottom from the package body during the cooling step.

According to one particular embodiment of the invention, which is particularly suitable for sealing a bottom on a box body needing to contain a neutral gas to preserve a product over a long duration, after inserting a bottom or a lid into a die and before inflating the extensible bearing element, the following sequence of steps is carried out:
  placing a space comprised between the package body, a product contained in the package body and the bottom under vacuum;
  introducing an inert gas into said space, for example nitrogen.

BRIEF DESCRIPTION OF THE DRAWINGS

Other features and advantages of the invention will emerge from reading the following description, in reference to the appended figures, in which.

DETAILED DESCRIPTION

Figure 1:
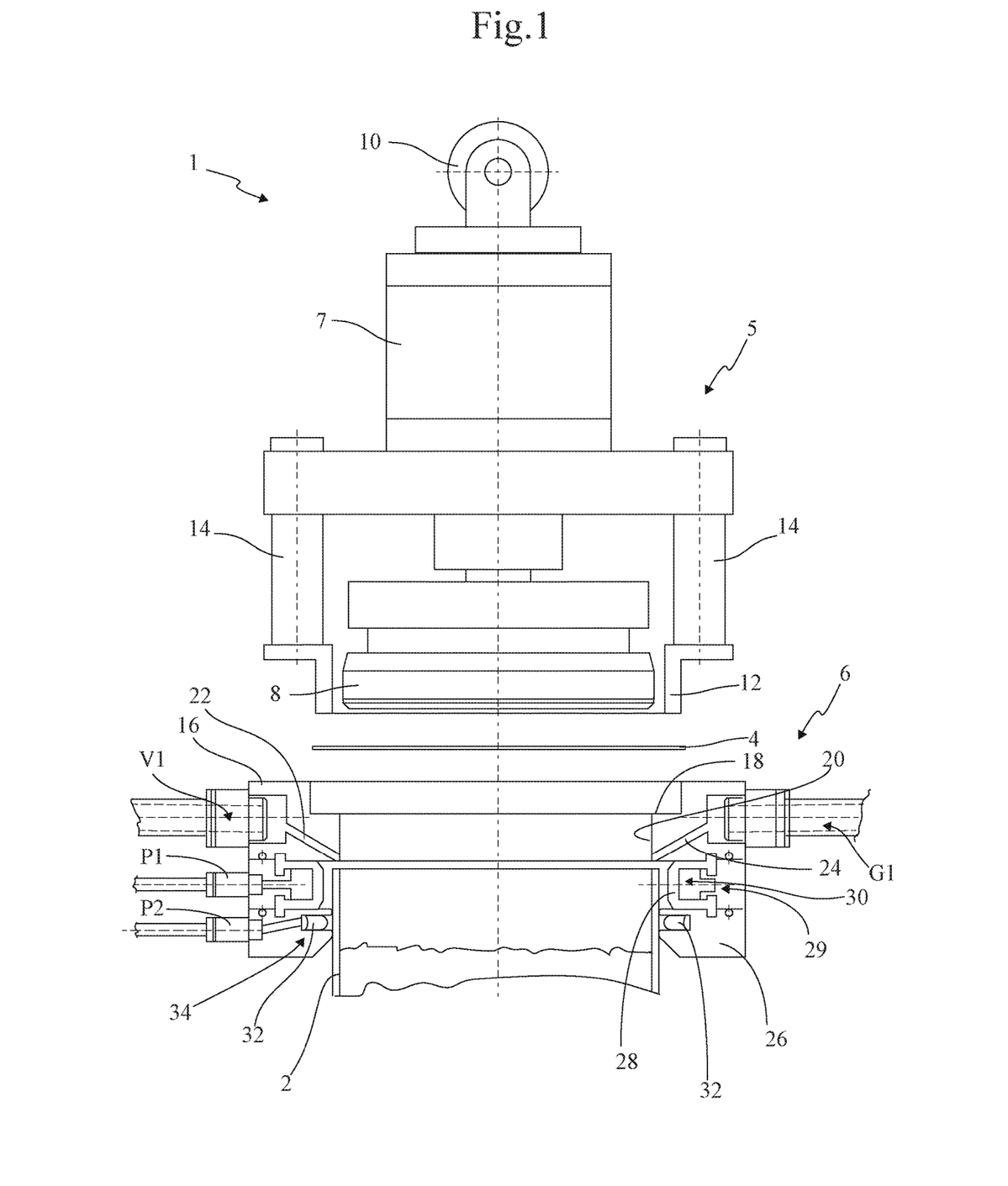
FIG. 1 is a cross-sectional view of a sealing tool of a facility for manufacturing a cardboard package according to the invention.

FIG. 1 shows a sealing tool 1 used in a facility for manufacturing a cardboard package comprising a box body 2 and a bottom 4. This sealing tool 1 allows the assembly of the bottom 4, introduced beforehand into the sealing tool 1 in the form of a flat piece, to the box body 2, shown in the figures as having a shape of revolution with a square cross-section. It will, however, be noted that of course, the sealing tool 1 can be adapted to all types of packages with a shape of revolution, such as packages with a circular, oval, triangular, oblong, etc. cross-section.

The box body 2 here is made up of three layers assembled to one another using a glue dispersed in water:
  a liner in contact with the product made from paper, a film forming a barrier to oxygen and steam, for example with a base of polyethylene terephthalate and a reactivatable sealing film, for example with a base of low-density or high-density polyethylene. Such a package is for example described in document EP 2,623,306.
  one to three layers of fresh or recycled fiber-based cardboard to give the box body its strength; and
  a label primarily made from fresh fibers and preferably printed with water-based inks and varnish in order to prevent any transmission of mineral oil into the food product.

The sealing tool 1 comprises a device 5 for introducing the bottom 4 into a sealing device 6.

The introduction device 5 comprises an actuator 7 making it possible to introduce a sealing stamp 8 into a die 16 in which the box body 2 is placed containing the product (not shown for clarity reasons). The actuator 7, connected at a first end to the sealing stamp 8, is connected at its opposite end to a pushing roller 10 actuated by a mechanical cam, a servomotor, a jack (not shown) making it possible to cause it to lower the sealing stamp 8 into the die 16 after the bottom 4 has been introduced across from the sealing stamp 8 and the die 16.

The introduction device 5 also comprises a die cushion 12 serving to constrain the flanks of the bottom 4 to prevent folds from forming in the material and thus to guarantee the sealing of the bottom 4, the action of which is combined with springs 14 so as to keep the bottom 4 under stress.

The sealing stamp 8 here has a general shape of revolution with a polygonal section, in order to give the bottom 4 a shape adapted to that of the box body 2. During the sealing method, it is heated by conduction, high frequency, pulsation or ultrasound. The means for heating the sealing stamp 8 here are not shown for clarity reasons.

The sealing device 6 comprises a shaping die 16, for example made from treated steel, intended to receive the flat bottom 4 previously cut. This die 16 comprises a centering cavity 18, generally basin-shaped, the circumference of which corresponds to that of the precut bottom 4, on which the bottom 4 will be centered by stamping under the effect of the lowering of the sealing stamp 8 moved by the actuator 7. The die 16 further comprises a shaping bore 20, located in the extension of the centering cavity 18, with dimensions smaller than those of the centering cavity 18, so as to impart the final basin shape to the bottom 4 by stamping via the sealing stamp 8.

The die 16 additionally comprises a vacuum channel 22 connecting its enclosure to a vacuum pipe V1, making it possible to create the vacuum in the die 16. The die 16 also comprises a gassing channel 24 arranged opposite the vacuum channel 22. The gassing channel 24 connects the chamber of the die 16 to a gassing pipe G1 that allows it to be supplied with gas. The gassing channel 24 and the gassing pipe G1 are in particular used in the context of manufacturing packages to be filled with neutral gas to increase the conservation time of food products they are intended to contain.

The sealing device 8 also comprises a counter-die 26 (here generally polygonal in light of the shape of the box body 2), for example made from treated steel, arranged below the matrix 16. It is adapted to the shapes and sizes of the box body 2 that it receives. Thus, in the case at hand, it has a general shape of revolution with a substantially square section.

The counter-die 26 is provided with an extensible bearing element (or extensible profile) 28 with a generally polygonal (or round) shape installed in a housing 29 arranged over the entire circumference of the counter-die 26. The box body 4 is arranged in the counter-die 26 so as to be across from the extensible bearing element 28. In order for it to be able to be inflated, the walls of the extensible bearing element 28 delimit an inflation cavity 30 that is placed across from an inflation pipe P1 allowing it to be supplied with compressed air. Preferably but optionally, the counter-die 26 also comprises a sealing gasket 32 positioned in a housing 34 arranged in the circumference of the counter-die 26. This sealing gasket 32, which is for example an elastomeric semi-O-ring, can also be inflated via an additional inflation pipe P2.

Figure 3:
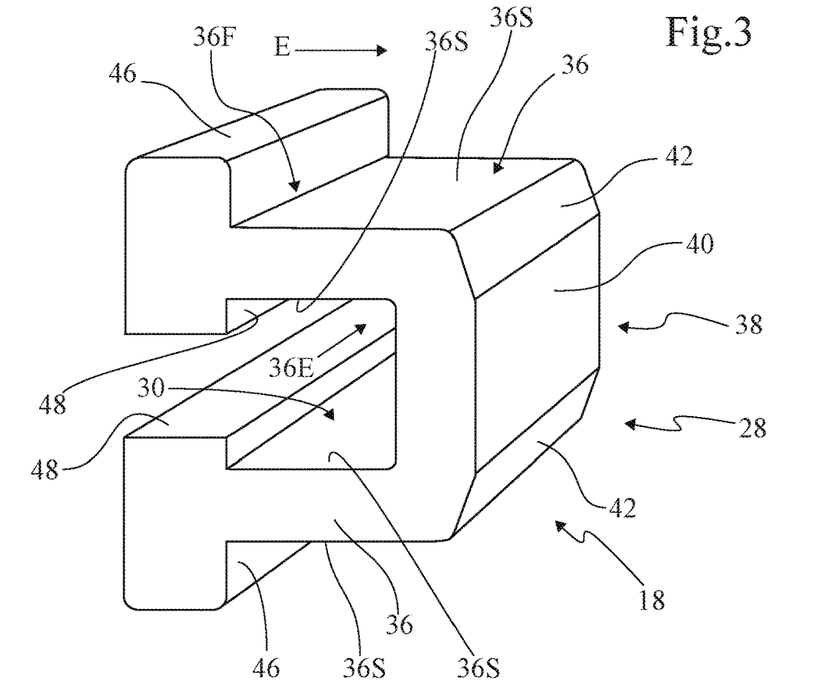
FIG. 3 is a perspective view of a section of an extensible bearing element of the sealing tool of FIG. 1 according to a first embodiment of the invention.

We will now provide a detailed description of the extensible bearing element 28 in reference to FIG. 3, which illustrates a portion thereof in the idle state. The extensible bearing element 28 comprises a profile in cross-section comprising two extension sections 36, or horizontal sections, with a parallel generally elongated shape extending along an extension direction, illustrated by arrow E.

The extension sections 36 are each connected, at one of their ends 36E, to a bearing section 38, such that the extension sections 36 and the bearing section 38 define an inflation cavity 30 of the extensible bearing element 28. Once the extensible bearing element 28 is placed in its housing 29 in the counter-die 26, the inflation cavity 30 is across from the inflation pipe P1. The union of the extension sections 36 and the bearing section 38 makes the profile of the extensible bearing element 28 generally U-shaped.

The extension sections 36 are configured so as to extend along the extension direction E during the inflation of the extensible bearing element 28. The inflation of the extensible bearing element 28 is done, as will be seen later, by introducing air at a predetermined pressure into the inflation cavity 30. Once the extensible bearing element 28 is placed in its housing 29 in the counter-die 26, the extension of the extension sections 36 is done in the direction from the housing 29 toward the box body 2. The extension sections 36 are preferably delimited by two flat outer surfaces 36S. In the example shown in the figures, they are substantially parallelepiped.

The bearing section 38 comprises a substantially flat free bearing surface 40, configured to come into contact with the package body 2. The bearing surface 40 extends along a plane substantially normal to the extension direction. In this way, the food product powder not only has little chance of being deposited there, but if it is deposited there, it will not remain in contact with the bearing surface 40 during the deflation, followed by re-inflation of the extensible bearing element.

The bearing section 38 further comprises, at the junctions with the extension sections, beveled release portions 42. More particularly, the beveled recess portions 42 form a chamfer between the extension sections 36 and the bearing surface 40, for example producing an angle between 20° and 40°, preferably 30° with the extension sections 36.

Figure 4:
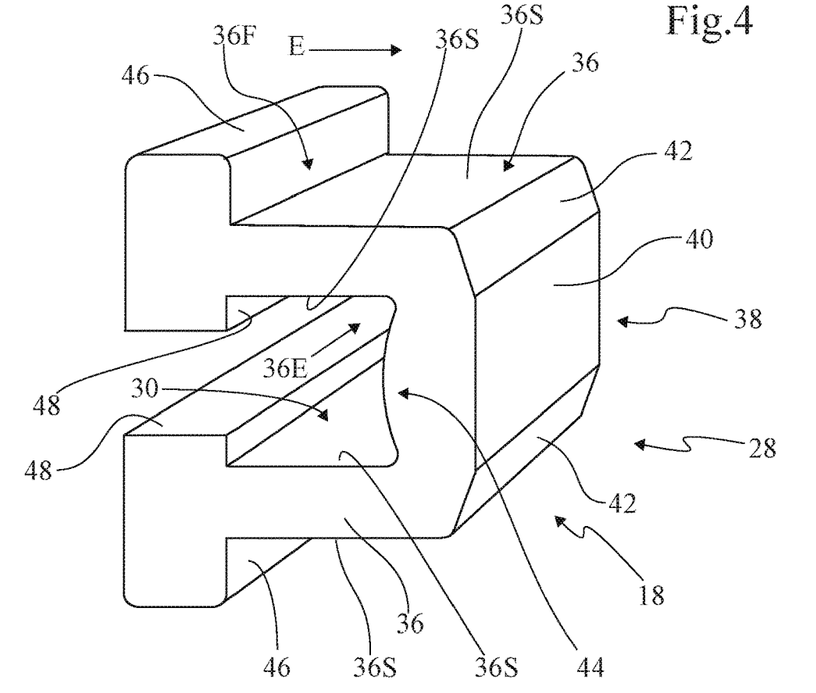
FIG. 4 is a view similar to FIG. 3 of an extensible bearing element according to a second embodiment of the invention.

In a second embodiment of the extensible bearing element 28 illustrated in FIG. 4, in order to increase the surface of the bearing section 38 and therefore the forces transmitted by the extensible bearing element 28 onto the box body 2, the bearing section 38 comprises a concave reinforcing portion 44 extending in the direction away from the bearing surface 40. The reinforcing portion 44 for example extends from one extension section 36 to the other, over a portion of the circumference of the extensible bearing element 28 or over its entire circumference. The reinforcing portion 44 here has a substantially arc of circle-shaped cross-section. Other shapes may, however, be considered, as will be seen later.

The extensible bearing element 28 further comprises outer maintaining lips 46 extending, from ends 36F of the extension sections opposite the bearing section 38, along a direction substantially normal to the extension direction. Outer maintaining lips 46 respectively extend toward the outside of the extensible bearing element 28, in other words moving away from the inflation cavity 30. The outer maintaining lips 46 are housed in recesses provided to that end in the housing 29 of the extensible bearing element 28.

Preferably, in order to increase the sealing provided by the extensible bearing element 28 during vacuum, placement under low pressure and placement under high pressure phases of the inflation cavity 30 that are described later, the extensible bearing element 28 comprises inner maintaining lips 48, in addition to the outer maintaining lips 46. The inner maintaining lips 48 extend, from ends of the extension sections 36E opposite the bearing section 38, along a direction substantially normal to the extension direction. The inner maintaining lips 48 respectively extend toward the outside of the extensible bearing element 28, in other words approaching from the inflation cavity 30. The inner maintaining lips 48 are housed in recesses provided to that end in the housing 29 of the extensible bearing element 28.

The presence of the outer maintaining lips 46 and inner maintaining lips 48 thus gives the profile of the extensible bearing element 28 a general horseshoe shape.

The extensible bearing element 28 is made from elastomer, for example rubber whereof the density and hardness are adapted to the forces to be transmitted and whereof the resiliency allows an extension of about 2 to 5 mm. Furthermore, the material is chosen so as to be able to withstand temperatures of up to 250° C. In the example shown in the figures, the extensible bearing element 28 will have a generally square shape in light of the shape of the box body 2. However, the extensible bearing element 28, while remaining generally polygonal, may have shapes, for example triangular, oblong, oval, rectangular, round, etc. Examples of alternative shapes of the extensible bearing element 28 are illustrated in FIGS. 13A to 13F.

We will now describe a method for sealing a bottom 4 on a box body 2 using a sealing tool 1 in reference to FIGS. 1, 2 and 5 to 8.

The idle state of the sealing tool 1 is shown in FIG. 1. The bottom 4 has been introduced beforehand between the sealing stamp 8 and the die 16.

Figure 2:
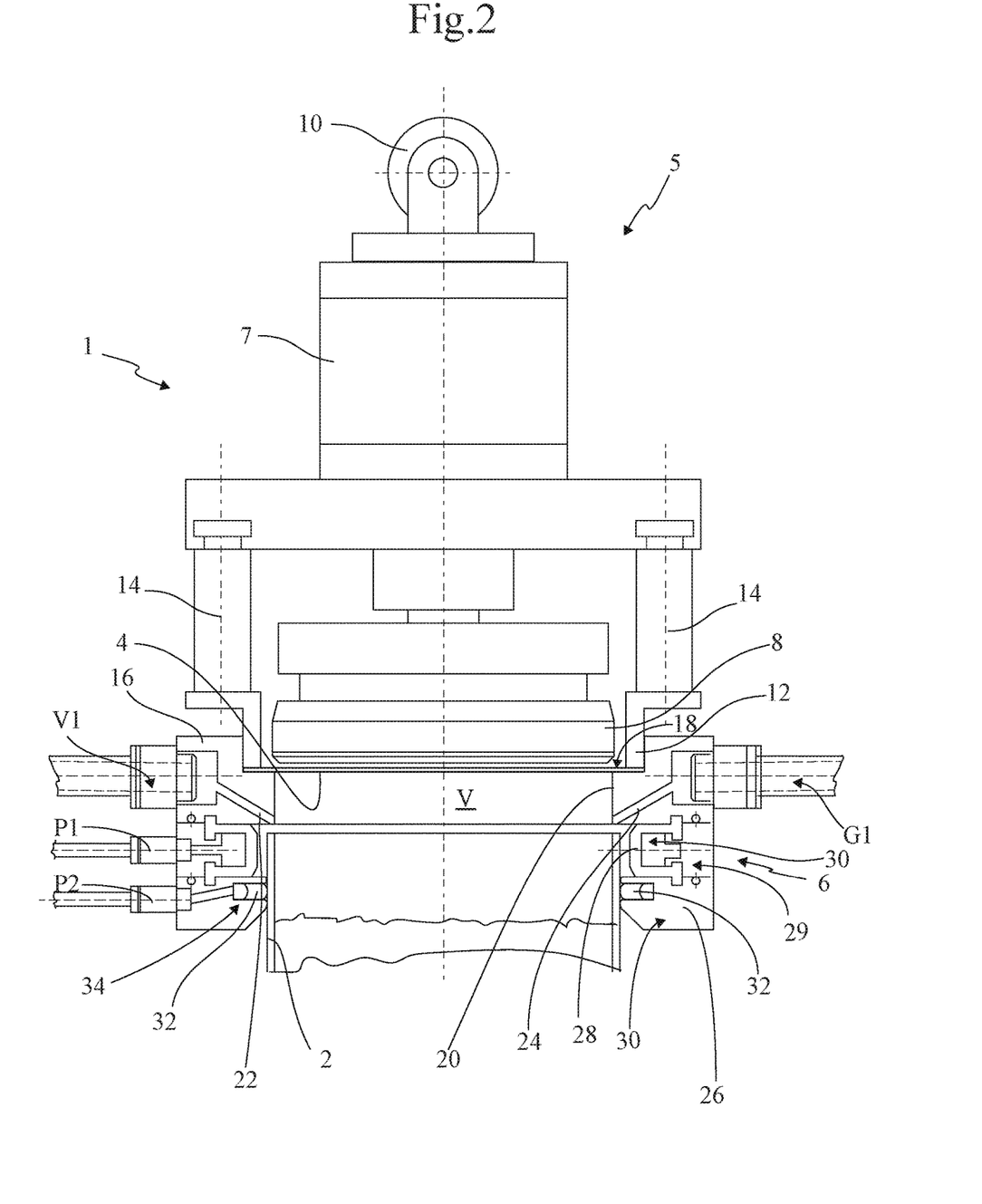
FIG. 2 is a view similar to FIG. 1, in which the sealing tool carries out a step for placing the package under vacuum.

In a vacuum step of the package illustrated in FIG. 2, the pushing roller 10 is actuated such that the actuator 7 simultaneously lowers both the sealing stamp 8 against the central part of the bottom 4 and the die cushion 12 against the flanks (the periphery) of the bottom 4. The bottom 4 is thus pressed against the centering cavity 18 and kept under strong pressure by the combined action of the die cushion 12 and the springs 14. At the same time or shortly thereafter, optionally, the sealing gasket 32 is inflated by introducing air into its inflation pipe P2 so as to provide good sealing of the volume V delimited by the bottom 4, the shaping die 16, the counter-die 26, the box body 2 and the product contained in the box body 2. Conversely, the extensible bearing element 28 is kept idle.

Optionally, before a vacuum step of the space V described later (in particular after introduction of the bottom 4 or lid 50 into the die 16, and before the step for inflation of the extensible bearing element 28 that will be described below), a step is carried out for pre-inflation of the extensible bearing element 28 to cause the extension of the extension sections 26 such that the extension of the extension sections 26 causes the bearing surface 40 to be placed in contact against the box body 2.

The pre-inflation of the extensible bearing element 28 is done by introducing air at a predetermined pre-inflation pressure (below the inflation pressure mentioned below) via the inflation pipe P1, such that it rushes into the inflation cavity 30 and inflates the extensible bearing element 28. The pre-inflation pressure $P_{B1}$, or low inflation pressure, is for example between 0.5 and 1.5 bar.

The pre-inflation step allows the extensible bearing element 28 to perform a second sealing function of the space V, like the sealing gasket 32, in addition to or as a replacement for the sealing gasket 32. Thus, in the case where the sealing constraints are lower (for example for certain products like flour), it is possible to do without the sealing gasket 32, the sealing function of the space V being performed by the extensible bearing element 28 in the pre-inflated state. Conversely, in the case where the sealing constraints are high, for example for products for which the package must receive a neutral gas in order to increase the conservation time of the food products located therein (fatty products like nuts, baby food, etc.), it is possible to complete the action of the sealing gasket 32 by that of the pre-inflation of the extensible bearing element 28. Lastly, in some cases, the presence of the sealing gasket 32 may make it possible to eliminate the pre-inflation step.

The vacuum is next produced in the space V by suctioning air contained therein through the vacuum channel 22 and the vacuum pipe V1. Preferably, this action is done so as to obtain a depression between −50 and −300 millibars in the space V.

Figure 5:
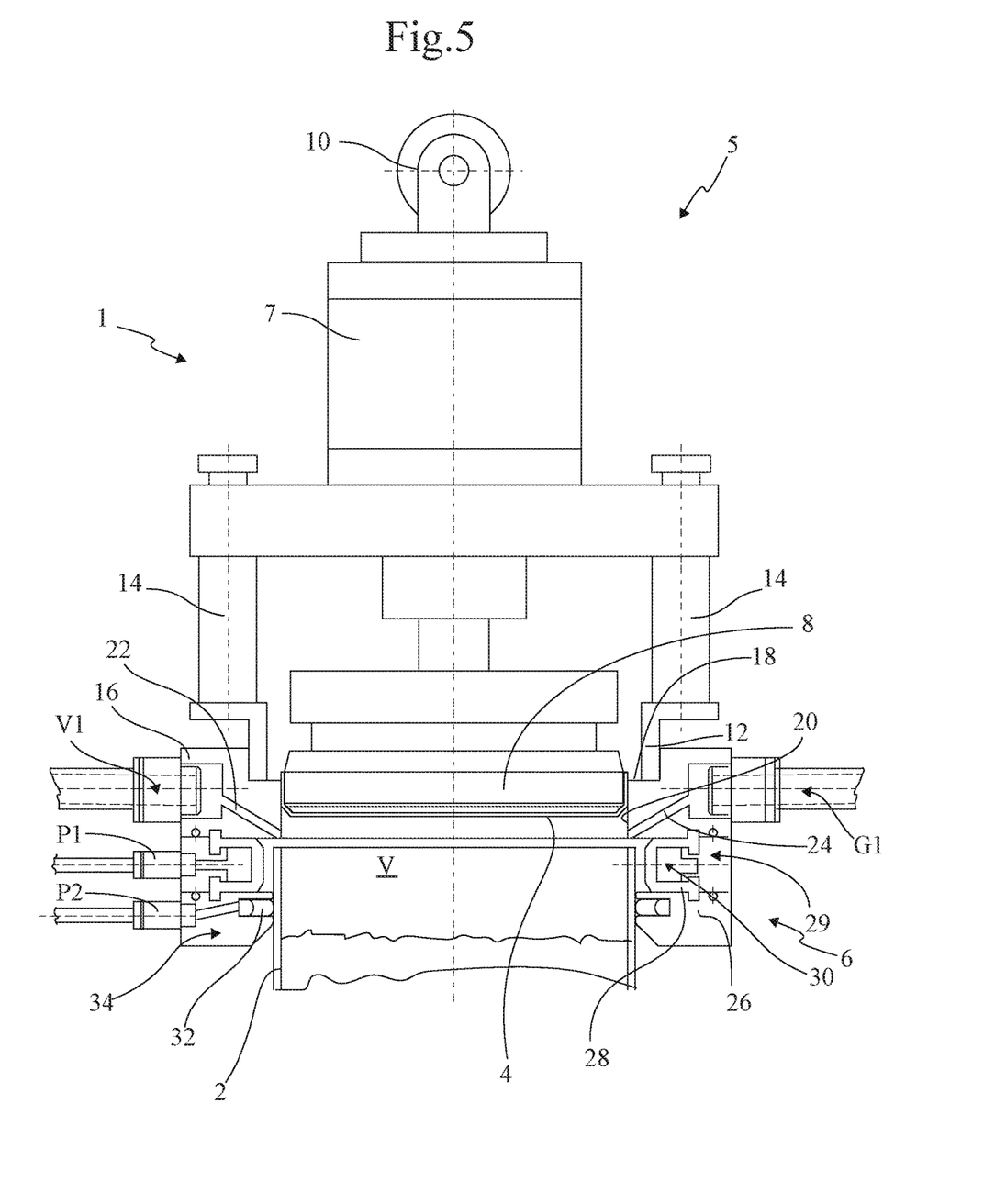
FIG. 5 is a view similar to FIG. 1, in which the sealing tool carries out a step for shaping a package bottom.

In a step for shaping the bottom 4 illustrated in FIG. 5, the actuator 7 moves the sealing stamp 8 toward the die 16 so as to form the bottom 4 in a basin shape, due to the reduction in passage section between the centering cavity 18 and the shaping bore 20. The bottom 4 is kept under pressure by the die cushion 12, the action of which is combined with those of the springs 14.

In the context of boxes intended to contain a neutral gas so as to increase the conservation time of the food products contained therein, a gassing step is carried out after the vacuum step, preferably in parallel with the shaping of the bottom. A neutral gas such as nitrogen is introduced into the die 16 via the gassing channel 24 and the gassing pipe G1. This gassing step is naturally operational if the introduction of gas into the package is not necessary due to the nature of the products to be stored.

Figure 6:
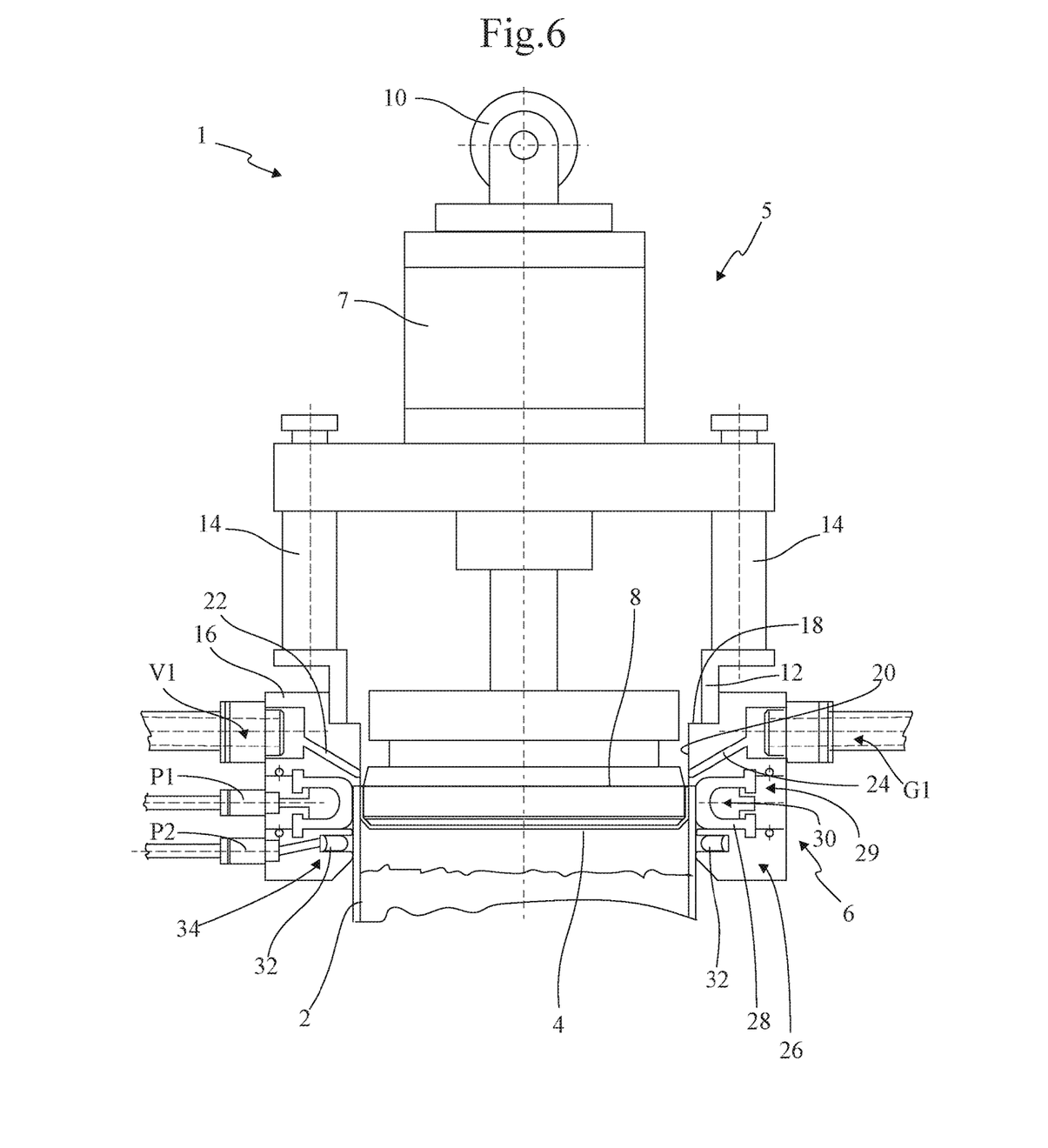
FIG. 6 is a view similar to FIG. 1, in which the sealing tool carries out a step for sealing a package bottom to a package body.

In a placement and sealing step of the bottom illustrated in FIG. 6, the actuator 7 moves the sealing stamp 8 so as to place the bottom 4 in the box body 2 kept under vacuum. The contact of the sealing stamp 8, preheated to a predefined temperature, with the bottom 4, causes the melting of the reactivatable material allowing the bonding between the walls of the bottom 4 and the body 2.

In parallel, air at a predetermined inflation pressure, or high inflation pressure, $P_H$ is sent via the inflation pipe P1, such that it rushes into the inflation cavity 30 and inflates the extensible bearing element 28. The high inflation pressure $P_H$ is for example between 4 and 16 bars. During this inflation, the extension sections 36 elongate (stretch) due to their resiliency. The bearing surface 40 then comes into contact with the wall of the box body 2 located across from the extensible bearing element 28 so as to exert a substantial and uniform force there owing to its shape, which guarantees a good transmission of uniformly distributed forces. The sealing zone being located across from both the sealing stamp 8 and the extensible bearing zone 28 is therefore gripped between these two elements. Conversely, owing to the release portions 42, no force is exerted on the parts of the box body 2 in contact with the sealing stamp 8. As a result, the boxes are not deformed and the extensible bearing element 28 is destroyed significantly less quickly than an inflatable O-ring. The extensible bearing element 28 may for example exert an adjustable air pressure on the box body 2 between 4 and 16 bars. In one alternative, the inflation of the extensible bearing element 28 may be done by introducing a pressurized fluid into the inflatable cavity 30, preferably a heat transfer fluid such as glycol, for example. Of course, other heat transfer fluids may be considered. In this case, the pressure exerted on the box body 2 (high inflation pressure $P_H$) may be between 16 and 36 bars.

The heating operations of the materials by the sealing stamp 8 and the maintenance by the extensible bearing element 28 are done for a duration depending on the nature of the walls of the package. It may for example be between 0.2 and 3 seconds depending on the type of sealing tool used. During these operations, the sealing gasket 32 is relaxed to regain its idle position.

Figure 7:
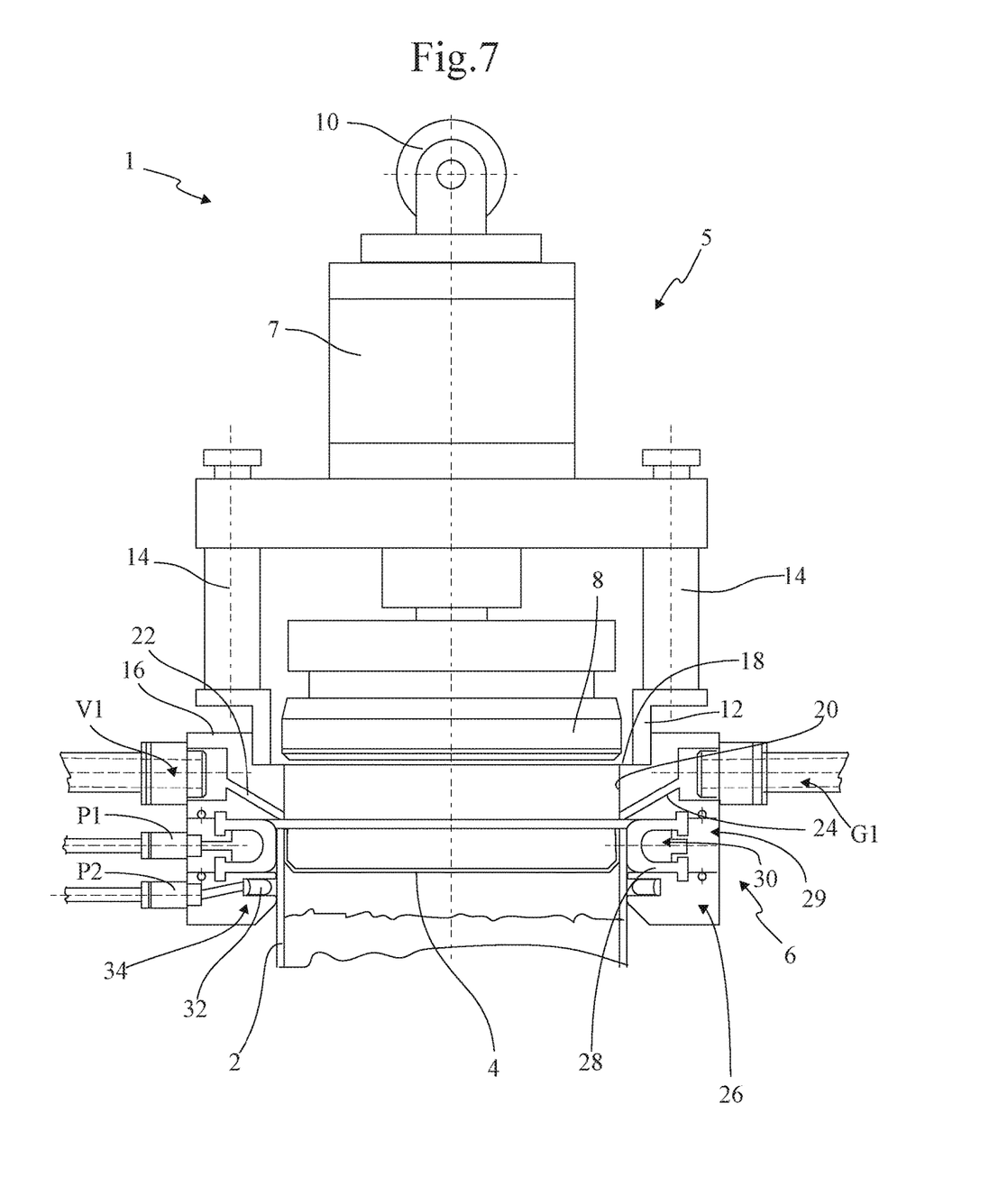
FIG. 7 is a view similar to FIG. 1, in which the sealing tool carries out a step for cooling a package bottom.

During a cooling step illustrated in FIG. 7, the sealing gasket 32 is placed under vacuum via the pipe P2. Part of the pressure exerted on the extensible bearing element 28 by introducing air from the pipe P1 is released (passage from the high pressure $P_H$ to a lower pressure $P_{B2}$) so as to relax it, but such that it keeps the box body 2 firmly in contact with the bottom 4 to avoid loosening between the bottom 4 and the box body 2. The sealing stamp 8 is then removed from the die 16 by means of the actuator 7. The bottom 4 of the box is, in parallel, cooled by blowing (the blowing means are not shown for clarity reasons) in the sealed zone with the box body 2.

Figure 8:
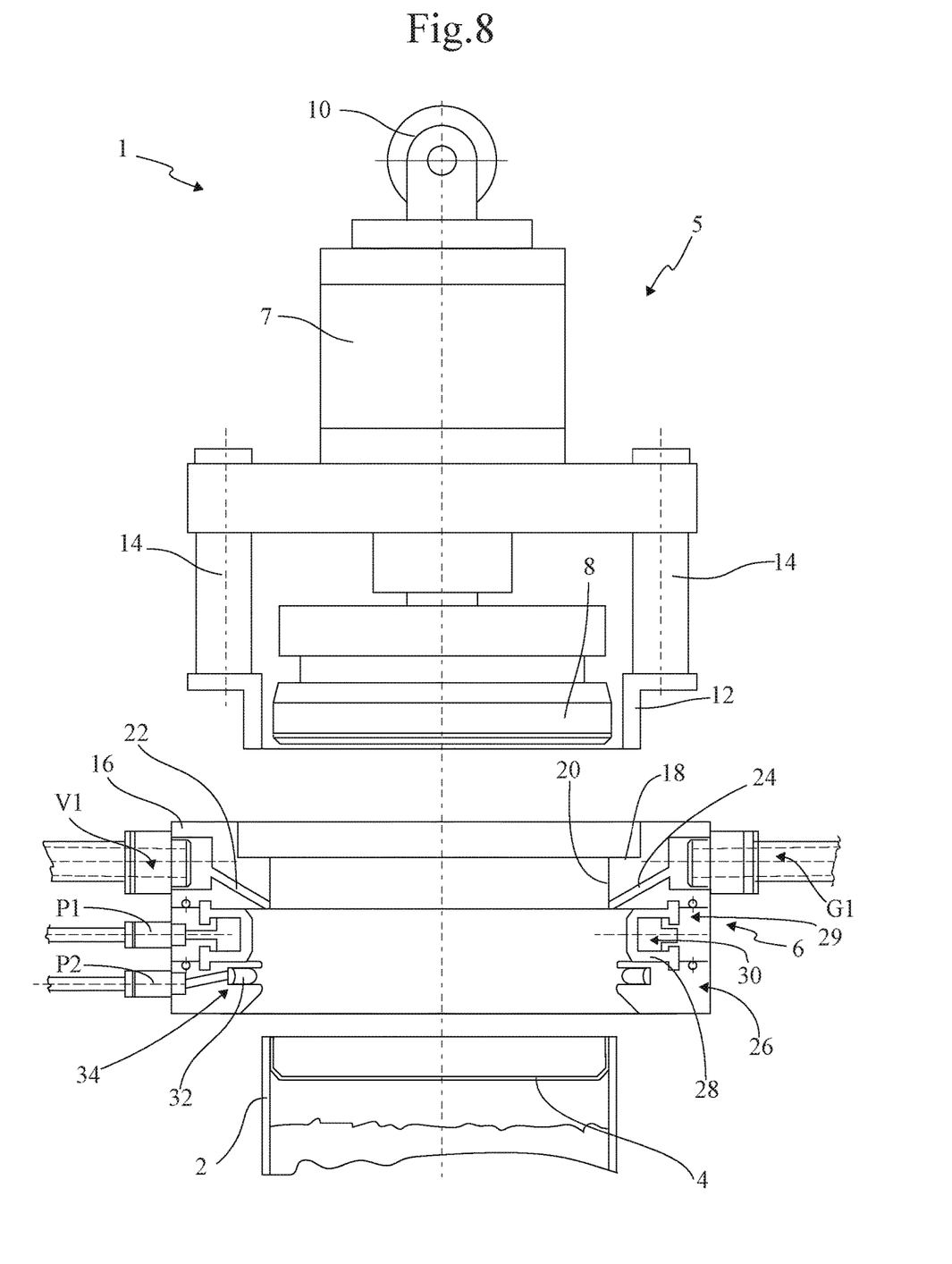
FIG. 8 is a view similar to FIG. 1, in which the sealing tool carries out a step for removing the package body.

In a removal step illustrated in FIG. 8, the extensible bearing element 28 is placed under vacuum via the pipe P1 such that it can be placed back in its housing 29 when idle for a new use. During this operation, any particles of food product that may have become deposited on the bearing surface 40 will detach therefrom such that the extensible bearing element 28, the die 16 and the counter-die 26 remain clean. Subsequently, once the extensible bearing element 28 is back in its housing 29, the box body 2 and bottom 4 assembly is removed from the matrix 16 without coming into contact with and causing wear of the extensible bearing element 28 by friction. The introduction device 5 then returns to its original position illustrated in FIG. 1 to be able to perform a new sequence of the sealing method.

Figure 9:
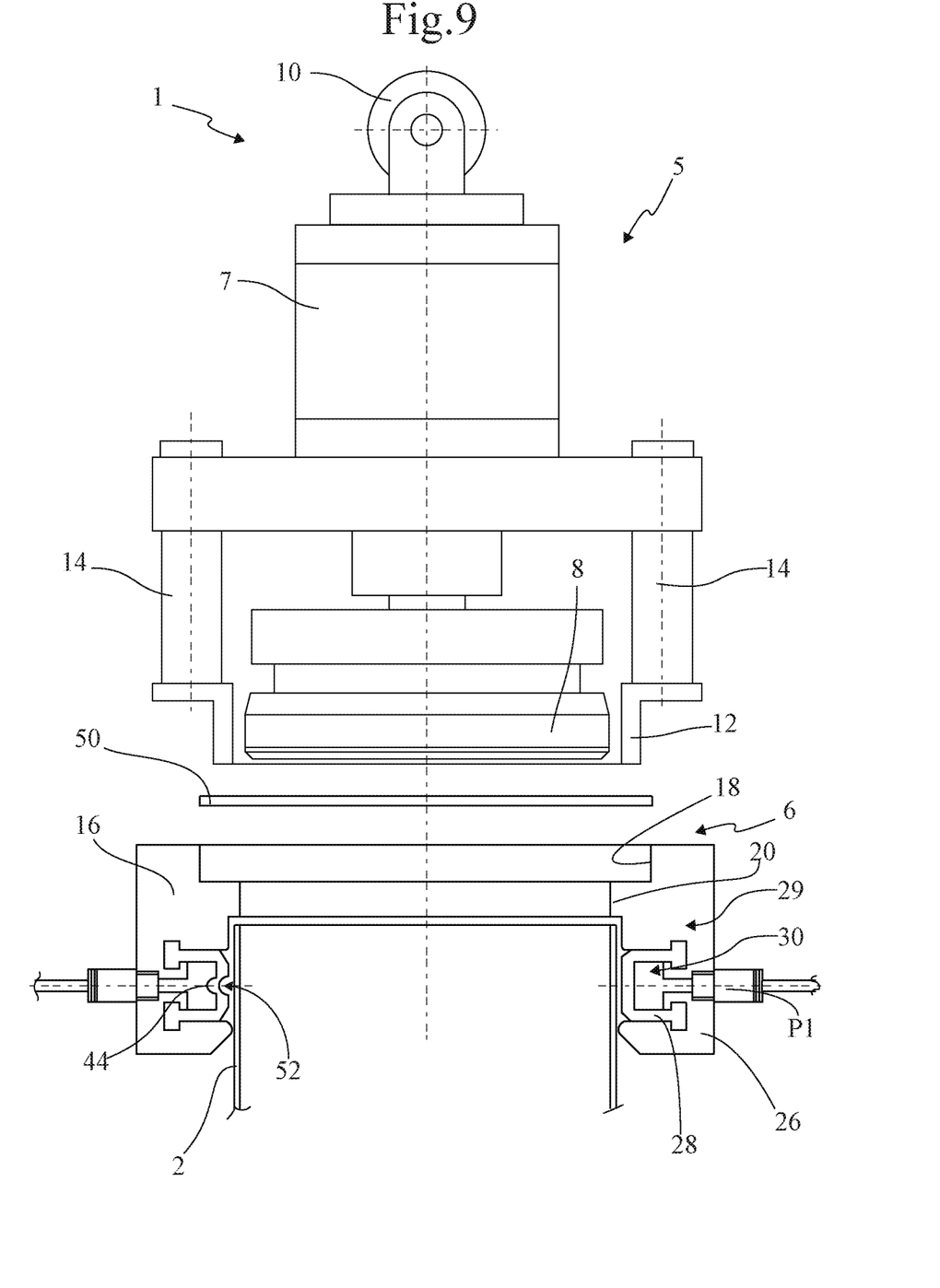
FIG. 9 is a view similar to FIG. 1, in which the sealing tool is used to shape a cardboard package lid.
Figure 10:
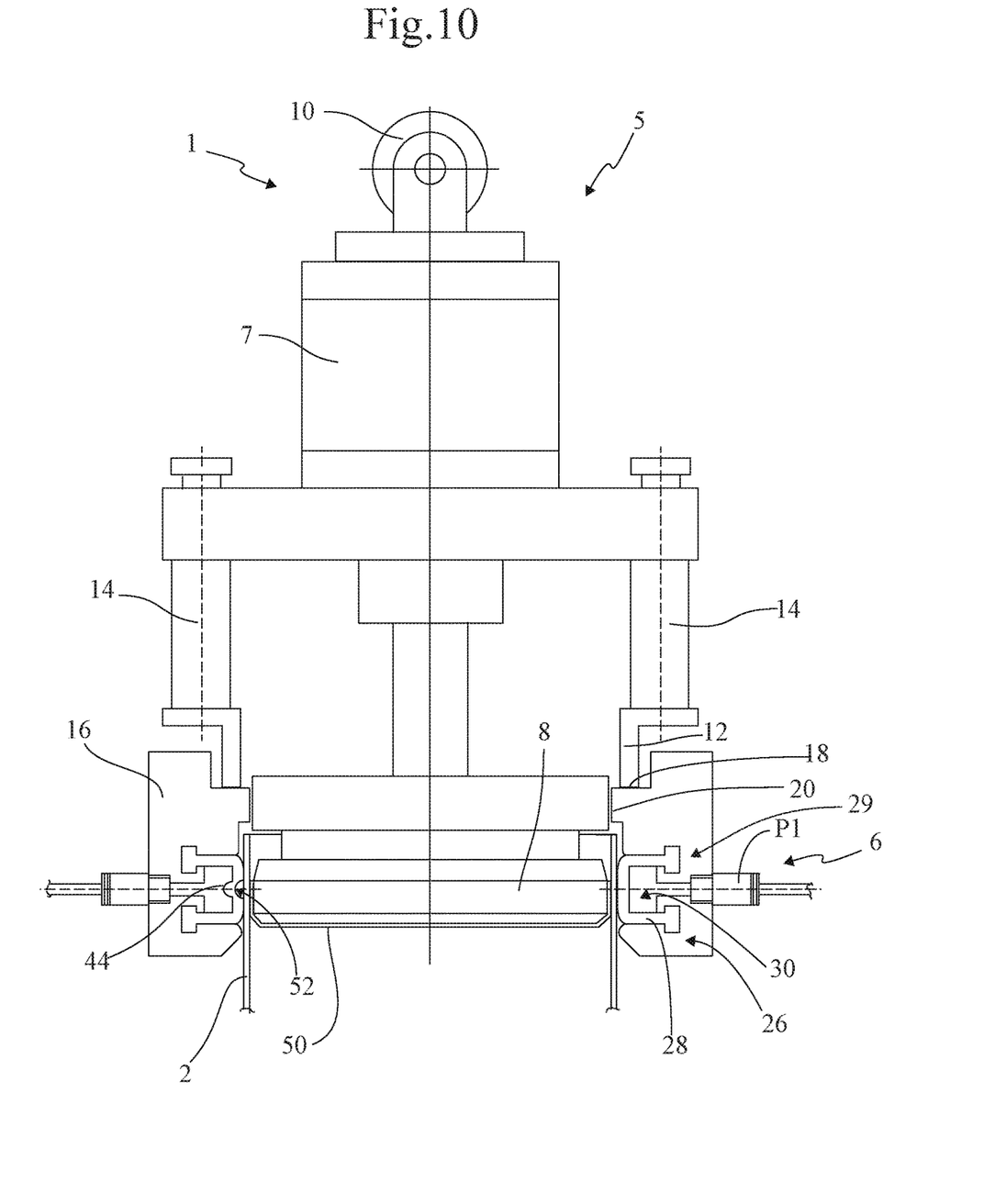
FIG. 10 is a view similar to FIG. 9, in which the sealing tool carries out a step for shaping a cardboard package lid.

We will now describe a sealing tool 1 according to a second embodiment making it possible to seal a lid 50 to a box body 2 in reference to FIGS. 9 and 10. The lid sealing tool 1 only differs from the bottom sealing tool 1 by its extensible bearing element 28, and by the fact that the vacuum and gassing channels and pipes are not necessary (and therefore not shown in FIGS. 9 and 10).

Figure 11:
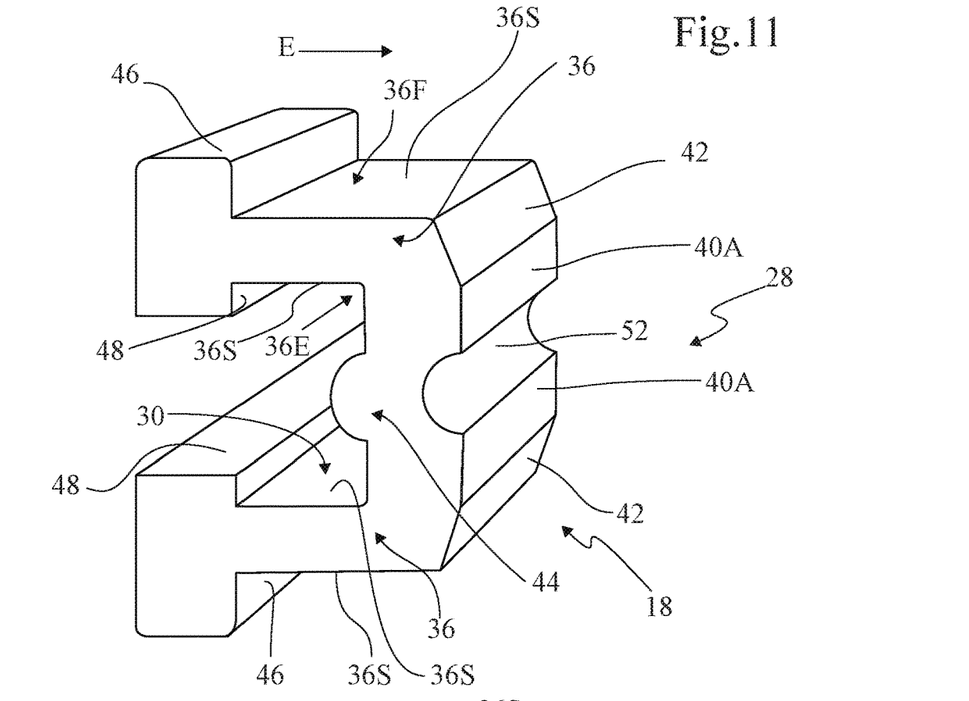
FIG. 11 is a view similar to FIG. 3 of an extensible bearing element according to a third embodiment of the invention.
Figure 12:
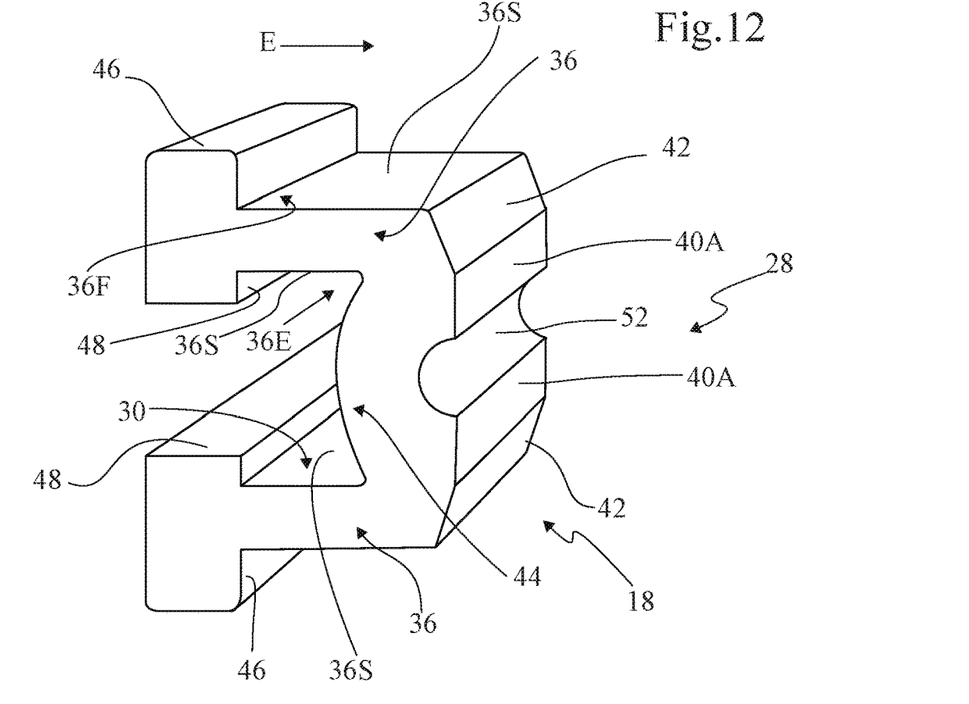
FIG. 12 is a view similar to FIG. 3 of an extensible bearing element according to a fourth embodiment of the invention.
Figures 13A, 13B, 13C, 13D:
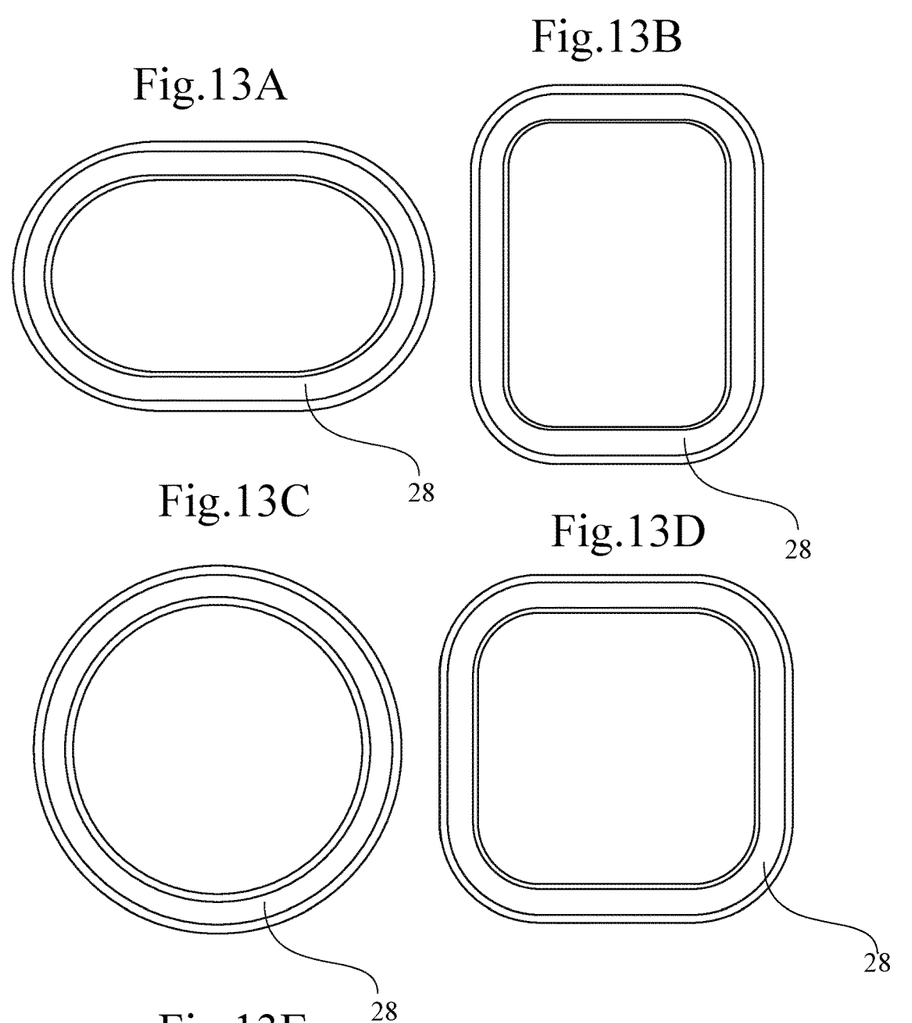
FIGS. 13A to 13F are top views of various extensible bearing elements according to the invention.
Figure 13E:
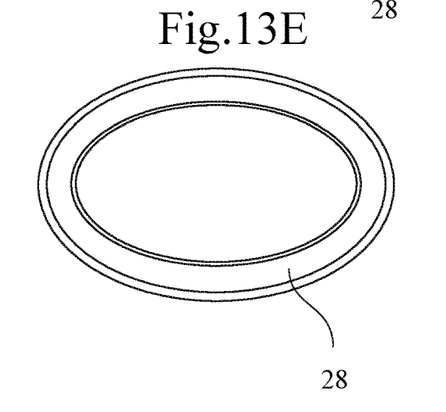
Figure 13F:
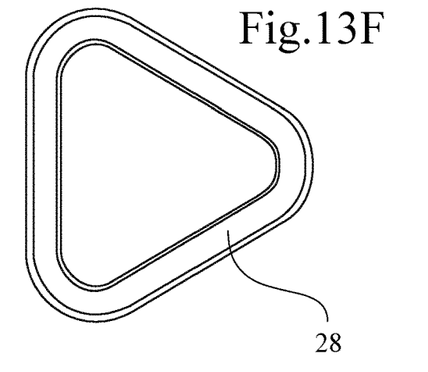

As can be seen in FIGS. 11 and 12, showing third and fourth embodiments of the extensible bearing element 28, an extensible bearing element 28 used to seal lids comprises a groove 52 arranged in the bearing surface 40 over a determined portion of the circumference of the extensible bearing element 28. The groove 52 is formed in a central zone of the bearing surface 40. In the examples shown in FIGS. 11 and 12, the bearing surface is thus divided into two bearing half surfaces 40A located on either side of the groove 52. The groove 52 for example has a semicircular section, but other shapes can naturally be considered.

In the third embodiment of the extensible bearing element 28 illustrated in FIG. 11, the bearing section 38 comprises a reinforcing portion 44 with a shape complementary to the groove 52 extending in the direction away from the bearing surface 40.

In the fourth embodiment of the extensible bearing element 28 illustrated in FIG. 12, the bearing section 38 comprises a reinforcing portion 44 identical to that of the second embodiment of the extensible bearing element 28 illustrated in FIG. 4, in other words with a concave shape connecting the two extension sections 36 with an arc of circle-shaped profile.

The presence of the groove 52 makes it possible to define a partial recess of the profile of the extensible bearing element 28 so as to create a sealing weak spot at an easy opening tongue of a membrane of the lid 50. As can be seen in FIG. 10 illustrating the extensible bearing element 28 in the active position, due to the presence of the groove 52, the zone F of the lid 50 located across from said groove 52 will not be stressed in the same way as the rest of the circumference of the box body 2. As a result, said zone F of the lid 50 will be sealed less firmly to the body of the box 2.

The method for sealing a lid 52 on a box body 2 is similar to that for sealing a bottom 4 on a box body, in which the vacuum and gassing steps are not carried out.

Naturally, the examples illustrated in the figures and discussed above are provided solely as an illustration and are not limiting. Various alternatives can be considered. It is explicitly set out that the various described embodiments can be combined. It is emphasized that all of the features, as they emerge for one skilled in the art from the present description, of the attached drawings and claims can be combined with other features or groups of features disclosed here, as long as this has not been expressly precluded or technical circumstances do not prevent it.

NOMENCLATURE

1: sealing tool
2: box body
4: bottom
5: introduction device
6: sealing device
7: actuator
8: sealing stamp
10: pushing roller
12: die cushion
14: springs
16: die
18: centering cavity
20: shaping bore
22: vacuum channel
V1: vacuum pipe
24: gassing channel
G1: gassing pipe
26: counter-die
28: extensible bearing element
29: housing of the extensible bearing element
30: inflation cavity of the extensible bearing element
P1: inflation pipe of the extensible bearing element
32: sealing gasket
P2: inflation pipe of the sealing gasket
34: housing of the sealing gasket
36: extension sections of the extensible bearing element
36S: outer surfaces of the extension sections
36E: junction end
36F: end opposite the junction end
38: Bearings section
40: Bearing surface
40A: half-bearing surfaces
42: Release portions
44: Reinforcing portion
46: Outer maintaining lips
48: Inner maintaining lips
50: Lid
52: Groove

The invention claimed is:

1. An extensible bearing element intended to be arranged in a tool for sealing a bottom or a lid of a cardboard package on a body of said package by melting using a sealing stamp of a reactivatable material allowing the bonding between one or more walls of the bottom or the lid and the body;
    the bearing element having a generally polygonal shape and being made from an elastomer, having a profile in cross-section comprising two extension sections with a parallel generally elongated shape extending along an extension direction (E),
    the extension sections each being connected, at one of their ends, to a bearing section, such that the extension sections and the bearing section define an inflation cavity of the extensible bearing element,
    the extension sections being configured so as to extend along the extension direction (E) during the inflation of the extensible bearing element,
    the bearing section comprising a substantially flat free bearing surface, configured to come into contact with the package body, the bearing surface extending along a plane substantially normal to the extension direction (E),
    wherein the bearing element further comprises maintaining lip portions extending, from ends of the extension sections opposite the bearing section, along a direction substantially normal to the extension direction (E), and
    wherein the bearing section further comprising, at junctions with the extension sections, beveled release portions.

2. The extensible bearing element according to claim 1, wherein the maintaining lip portions comprise outer maintaining lips extending, from ends of the extension sections opposite the bearing section, along a direction substantially normal to the extension direction moving away from the inflation cavity.

3. The extensible bearing element according to claim 1, wherein the maintaining lip portions comprise inner maintaining lips extending, from ends of the extension sections opposite the bearing section, along a direction substantially normal to the extension direction (E), toward an inside of the inflation cavity.

4. The extensible bearing element according to claim 2, wherein the maintaining lip portions comprises inner maintaining lips extending, from ends of the extension sections opposite the bearing section, along a direction substantially normal to the extension direction (E), toward an inside of the inflation cavity.

5. The extensible bearing element according to claim 1, wherein the bearing section comprises a convex reinforcing portion extending in the direction away from the bearing surface, the reinforcing portion extending from one extension section to the other.

6. The extensible bearing element according to claim 1, wherein a groove is formed in the bearing surface on a specific portion of a periphery of the extensible bearing element, the groove having a semicircular section.

7. The extensible bearing element according to claim 6, wherein the bearing section comprises a reinforcing portion with a shape complementary to the groove extending in the direction away from the bearing surface.

8. The extensible bearing element according to claim 1, wherein the beveled release portions form a chamfer between the extension sections and the bearing surface, wherein the chamfer is at an angle between 20° and 40° with the extension sections.

9. A device for sealing a lid or a bottom of a package on a package body comprising an extensible bearing element according to claim 1.

10. A device for sealing a lid or a bottom of a package on a package body by melting a reactivatable material using a sealing stamp allowing the bonding between one or more walls of the bottom or the lid and the body comprising:
an elastomeric extensible bearing element with a generally polygonal shape,
a die for shaping the bottom or the lid, intended to receive the bottom or the lid stamped using the sealing stamp;
a counter-die, intended to receive the package body, comprising a housing receiving the extensible bearing element located across from a sealing zone of the body of the package and across from the sealing stamp; and
wherein the extensible bearing element has a profile in cross-section comprising two extension sections with a parallel generally elongated shape extending along an extension direction (E),
the extension sections each being connected, at one of their ends, to a bearing section, such that the extension sections and the bearing section define an inflation cavity of the extensible bearing element,
the bearing section comprising a substantially flat free bearing surface, configured to come into contact with the package body, the bearing surface extending along a plane substantially normal to the extension direction (E),
means for inflating the extensible bearing element by means of the inflation cavity that are configured to cause the extension of the extension sections, such that the extension of the extension sections causes the bearing surface to be paced in contact against the package body,
the extension sections being configured so as to extend along the extension direction (E) during the inflation of the extensible bearing element.

11. The device according to claim 10, wherein the bearing section further comprising, at junctions with the extension sections, beveled release portions.

12. The device for sealing a lid or a bottom of a package on a package body according to claim 10, comprising means for creating a vacuum in a space comprised between the package body, a product contained in the body and the bottom, once the body is inserted into the counter-die and the bottom is inserted into the die.

13. A method for sealing a lid or a bottom of a package on a package body by melting a material using a sealing stamp allowing the bonding between the walls of the bottom or the lid and the body using a sealing device according to claim 10, comprising the following steps:
inserting a bottom or a lid by stamping using the sealing stamp into a shaping die for the bottom or the lid across from a counter-die provided with a housing into which the extensible bearing element is placed;
inflating the extensible bearing element by means of the inflation cavity to cause the extension of the extension sections, such that the extension of the extension sections causes the bearing surface to be placed in contact against the package body across from the sealing stamp;
sealing the bottom or the lid on the package body in the sealing zone being located across from both the sealing stamp and the extensible bearing element; and
placing the extensible bearing element under vacuum so as to cause the extensible bearing element to withdraw into the housing.

14. The method for sealing a lid or a bottom of a package on a package body according to claim 13, wherein the inflation of the extensible bearing element is done by introducing gas, air, or heat transfer fluid into the inflation cavity at a predetermined inflation pressure.

15. The method for sealing a lid or bottom of a package on a package body according to claim 14, wherein, after the step for inflating the extensible bearing element, and before the step for placing the extensible bearing element under vacuum, a step is carried out for partial deflation of the extensible bearing element, in which the pressure of the gas, air, or the heat transfer fluid introduced into the inflation cavity is reduced to a predetermined value below the inflation pressure.

16. The method for sealing a lid or a bottom of a package on a package body according to claim 13, wherein, after the step for inserting the bottom or the lid into the die, and before the step for inflating the extensible bearing element, a pre-inflation of the extensible bearing element is done to cause the extension of the extension sections, such that the extension of the extension sections causes the placement of the bearing surface in contact against the box body, the pre-inflation of the extensible bearing element being done by introduction of gas, air, or heat transfer fluid into the inflation cavity at a predetermined pre-inflation pressure lower than the inflation pressure.

17. The method for sealing a bottom of a package on a package body according to claim 13, wherein, after introducing a bottom or a lid into a die and before the step for inflating the extensible bearing member, the following sequence of steps is carried out:
placing a space comprised between the package body, a product contained in the package body and the bottom under vacuum; and introducing an inert gas into said space.

* * * * *